(12) United States Patent
Ueda et al.

(10) Patent No.: US 11,293,169 B2
(45) Date of Patent: Apr. 5, 2022

(54) WHEEL LOADER AND BUCKET LOAD CALCULATION METHOD

(71) Applicant: HITACHI CONSTRUCTION MACHINERY CO., LTD., Tokyo (JP)

(72) Inventors: Tomohiro Ueda, Akashi (JP); Masaki Yoshikawa, Kasama (JP); Takashi Ishii, Tsukuba (JP); Takayoshi Murahashi, Toride (JP); Masakazu Kaitou, Tsuchiura (JP); Koji Shimazaki, Akashi (JP); Isamu Aoki, Tsukuba (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 274 days.

(21) Appl. No.: 16/493,410

(22) PCT Filed: Sep. 19, 2018

(86) PCT No.: PCT/JP2018/034568
§ 371 (c)(1),
(2) Date: Sep. 12, 2019

(87) PCT Pub. No.: WO2019/065391
PCT Pub. Date: Apr. 4, 2019

(65) Prior Publication Data
US 2020/0131739 A1    Apr. 30, 2020

(30) Foreign Application Priority Data

Sep. 29, 2017 (JP) .............................. JP2017-191801

(51) Int. Cl.
*E02F 9/26* (2006.01)
*E02F 3/28* (2006.01)
(Continued)

(52) U.S. Cl.
CPC ............... *E02F 9/26* (2013.01); *E02F 3/283* (2013.01); *G01G 19/10* (2013.01); *G01G 19/16* (2013.01); *G07C 5/02* (2013.01)

(58) Field of Classification Search
CPC .......... G01G 19/10; G01G 19/16; G07C 5/02; G07C 5/08; E02F 3/283; E02F 9/26; E02F 9/264
See application file for complete search history.

(56) References Cited

U.S. PATENT DOCUMENTS 8,428,832 B2 * 4/2013 Marathe ................. E02F 9/264
701/50
8,560,181 B2 * 10/2013 Ekvall ................... E02F 9/2029
701/50
(Continued)

FOREIGN PATENT DOCUMENTS

JP       57-021637 A    2/1982
JP       60-082595 A    5/1985
(Continued)

OTHER PUBLICATIONS

International Search Report of PCT/JP2018/034568 dated Nov. 27, 2018.

*Primary Examiner* — Tyler J Lee
(74) *Attorney, Agent, or Firm* — Mattingly & Malur, PC

(57) ABSTRACT

In an unloaded state of the bucket (3), a control device (30) calculates an unloaded moment ($M_0$) around a hinge pin G from the pressure of the lift arm cylinder that is detected by pressure sensors (15a, 15b), the angle of a lift arm that is detected by a lift arm angle sensor 14, and dimension data extracted from a vehicle body information database (35). In a loaded state of the bucket, the control device calculates a loaded moment ($M_1$) around the hinge pin G from the pressure of the lift arm cylinder, the angle of the lift arm, and the dimension data extracted from the vehicle body infor- (Continued)

mation database. The control device calculates the load (W) on the bucket by dividing the difference between the unloaded moment and the loaded moment by the horizontal distance ($L_w$) between the hinge pin and the gravity center position of the bucket.

6 Claims, 9 Drawing Sheets

(51) Int. Cl.
  *G01G 19/10* (2006.01)
  *G01G 19/16* (2006.01)
  *G07C 5/02* (2006.01)

(56) References Cited

U.S. PATENT DOCUMENTS

| | | | |
|---|---|---|---|
| 9,200,432 B1* | 12/2015 | Shatters | E02F 9/2264 |
| 9,464,403 B2* | 10/2016 | Shatters | E02F 3/422 |
| 2005/0095108 A1* | 5/2005 | Hinds | B66C 23/54 |
| | | | 414/680 |
| 2008/0169131 A1 | 7/2008 | Takeda et al. | |
| 2010/0161185 A1* | 6/2010 | Marathe | E02F 9/264 |
| | | | 701/50 |
| 2015/0354177 A1 | 12/2015 | Shatters | |
| 2017/0131134 A1 | 5/2017 | Kang | |

FOREIGN PATENT DOCUMENTS

| | | |
|---|---|---|
| JP | 61-40455 U | 3/1986 |
| JP | 2003-269205 A | 9/2003 |
| JP | 2006-078348 A | 3/2006 |
| JP | 2006-336390 A | 12/2006 |
| JP | 2012-220216 A | 11/2012 |
| WO | 2006/098218 A1 | 9/2006 |
| WO | 2016/208275 A1 | 12/2016 |

\* cited by examiner

DETAIL X

WHEEL LOADER AND BUCKET LOAD CALCULATION METHOD

TECHNICAL FIELD

The present invention relates to a technical field for calculating a load applied to a bucket of a wheel loader.

BACKGROUND ART

A method described, for example, in Patent Literature 1 as a background art of the above-mentioned technical field "calculates the load of a material such as scrap metal or other scrap adhering to a front working device included in a magnet-type hydraulic excavator. More specifically, described is a load measurement method that calculates each moment in an unloaded state around first and second pins from the angle of each joint, the weight of each movable member, and gravity center position data on each movable member, calculates each moment in a loaded state around each pin from thrust calculated from a cylinder pressure around each pin, a boom angle, and a bucket angle, calculates a moment caused by a load around the first pin from the difference between the moment in a loaded state around the first pin and the moment in an unloaded state around the first pin, calculates a moment caused by a load around the second pin from the difference between the moment in a loaded state around the second pin and the moment in an unloaded state around the second pin, and calculates a lifting load by dividing the difference between the calculated moments by a horizontal distance between the first pin and the second pin." (refer to Abstract).

CITATION LIST

Patent Literature

PATENT LITERATURE 1: Japanese Patent Application Laid-Open Publication No. 2006-78348

SUMMARY OF INVENTION

Technical Problem

A working device of a hydraulic excavator includes a boom, a boom cylinder, an arm, an arm cylinder, a bucket, and a bucket cylinder. The front working device described in Patent Literature 1 is configured such that a magnet is attached instead of a bucket. Meanwhile, a working device of a wheel loader includes a lift arm, a lift arm cylinder, a bucket, and a bucket cylinder. Thus, the elements of the working device of the wheel loader differ from those of the working device of the hydraulic excavator. Further, a link mechanism for rotating the bucket of the hydraulic excavator is different from that of the wheel loader.

The hydraulic excavator finally uses the boom cylinder to receive a load applied to the bucket. Therefore, the load applied to the bucket can be calculated from a cylinder pressure of the boom cylinder. However, the wheel loader uses the lift arm cylinder and the bucket cylinder to receive the load applied to the bucket. Therefore, the load measurement method for the hydraulic excavator cannot directly be applied to the wheel loader. Patent Literature 1 discloses the load measurement method for the hydraulic excavator, but describes nothing about the application of the load measurement method to the wheel loader.

An object of the present invention is to provide a wheel loader capable of accurately calculating a bucket load from the pressure of a lift arm cylinder and provide a bucket load calculation method suitable for the wheel loader.

Solution to Problem

In accomplishing the above object, according to a representative aspect of the present invention, there is provided a wheel loader including a vehicle body, a working device, a lift arm angle sensor, a pressure sensor, a control device, and a vehicle body information database. The working device includes a lift arm, a lift arm cylinder, a bucket, and a bucket cylinder. The lift arm is disposed at the front of the vehicle body and coupled to the vehicle body via a hinge pin. The lift arm cylinder rotates the lift arm in a vertical direction. The bucket is coupled to a tip of the lift arm. The bucket cylinder rotates the bucket in the vertical direction. The lift arm angle sensor detects the angle of the lift arm. The pressure sensor detects the pressure of the lift arm cylinder. The control device calculates a load on the bucket. The vehicle body information database stores vehicle information including dimension data on the working device. In an unloaded state of the bucket, the control device calculates an unloaded moment, namely, the moment around the hinge pin, from the pressure of the lift arm cylinder that is detected by the pressure sensor, the angle of the lift arm that is detected by the lift arm angle sensor, and the dimension data extracted from the vehicle body information database. In a loaded state of the bucket, the control device calculates a loaded moment, namely, the moment around the hinge pin, from the pressure of the lift arm cylinder that is detected by the pressure sensor, the angle of the lift arm that is detected by the lift arm angle sensor, and the dimension data extracted from the vehicle body information database. The control device calculates the load on the bucket by dividing the difference between the unloaded moment and the loaded moment by the horizontal distance between the hinge pin and the gravity center position of the bucket.

Advantageous Effects of Invention

The present invention makes it possible to accurately calculate a load on a bucket from the pressure of a lift arm cylinder. Problems, configurations, and advantageous effects other than those described above will become apparent from the following description of embodiments.

DESCRIPTION OF EMBODIMENTS

Embodiments of a wheel loader according to the present invention will now be described with reference to the accompanying drawings.

First Embodiment

Figure 1:
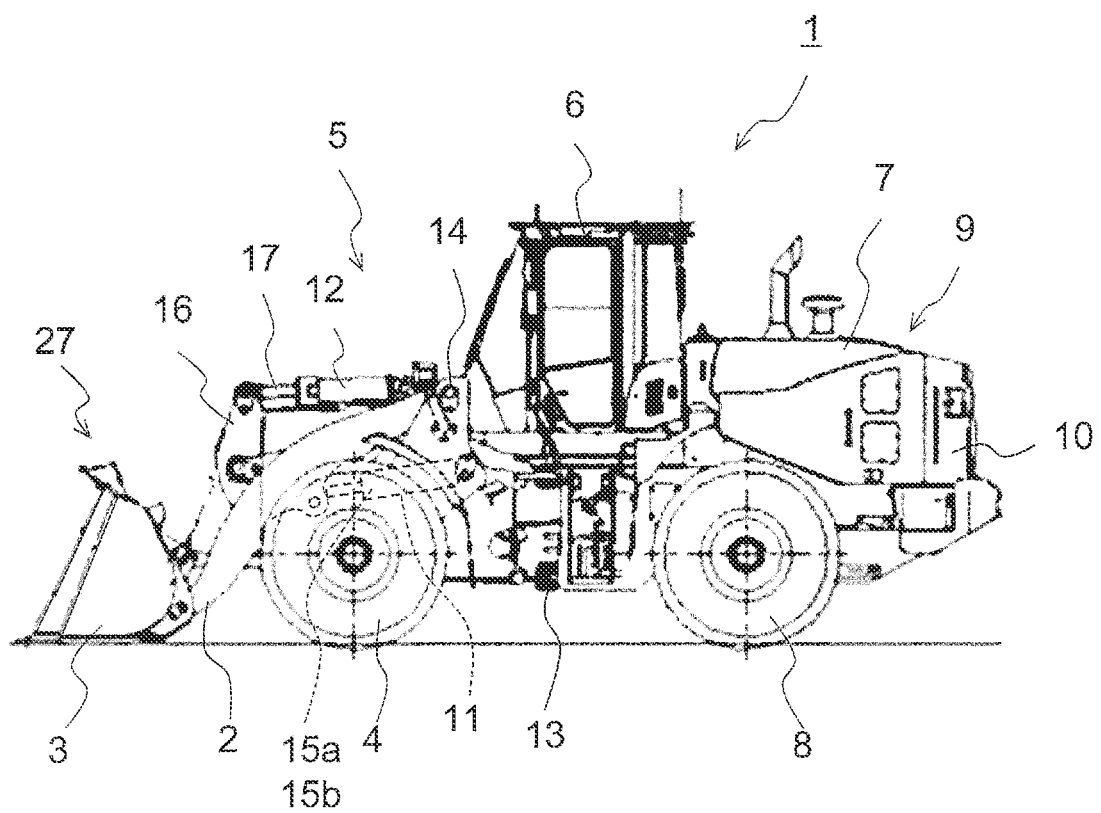
FIG. 1 is a side view illustrating a wheel loader according to a first embodiment of the present invention.

FIG. 1 is a side view illustrating a wheel loader 1 according to a first embodiment of the present invention. As illustrated in FIG. 1, the wheel loader 1 includes a working device 27, a front frame (vehicle body) 5 including, for example, tires 4, a cab 6, an engine compartment 7, and a rear frame (vehicle body) 9 including, for example, tires 8. An engine (not depicted) is mounted in the engine compartment 7. A counterweight 10 is mounted on the rear of the rear frame 9.

The working device 27 includes a lift arm 2, a lift arm cylinder 11, a bucket 3, and a bucket cylinder 12. The lift arm 2 is coupled to the front of the front frame 5 via a lift arm hinge pin G (see FIG. 4). The lift arm cylinder 11 pivots the lift arm 2 in a vertical direction. The bucket 3 is coupled to the tip of the lift arm 2. The bucket cylinder 12 pivots the bucket 3 in the vertical direction. The lift arm 2 includes a pair of left and right plate materials extended in a front-rear direction. The lift arm cylinder 11 includes a pair of left and right hydraulic cylinders.

The lift arm cylinder 11 drives the lift arm 2 in such a manner as to pivot the lift arm 2 in the vertical direction (elevation motion). The bucket cylinder 12 drives the bucket 3 in such a manner as to pivot the bucket 3 in the vertical direction (crowding or dumping). The front frame 5 and the rear frame 9 are pivotally coupled to each other by a center pin 13. A steering cylinder (not depicted) expands and contracts so as to bend the front frame 5 leftward and rightward with respect to the rear frame 9.

A lift arm angle sensor 14 is mounted at a joint between the lift arm 2 and the front frame 5, and used to detect the pivot angle of the lift arm 2. The lift arm cylinder 11 includes pressure sensors 15a, 15b. The pressure sensor 15a detects the bottom pressure of the lift arm cylinder 11. The pressure sensor 15b detects the rod pressure of the lift arm cylinder 11. A link mechanism including a bell crank 16 and a push rod 23 is disposed between the bucket cylinder 12 and the bucket 3. The bucket cylinder 12 pivots the bucket 3 via the link mechanism. The bucket cylinder 12 includes a bucket proximity switch 17. When the rod of the bucket cylinder 12 is placed in the most contracted state, the bucket proximity switch 17 turns on.

Although details will be described later, the present embodiment is configured so as to calculate the load W on the bucket 3 in response to detection signals from the pressure sensors 15a, 15b, the bucket proximity switch 17, and the lift arm angle sensor 14.

Figure 2:
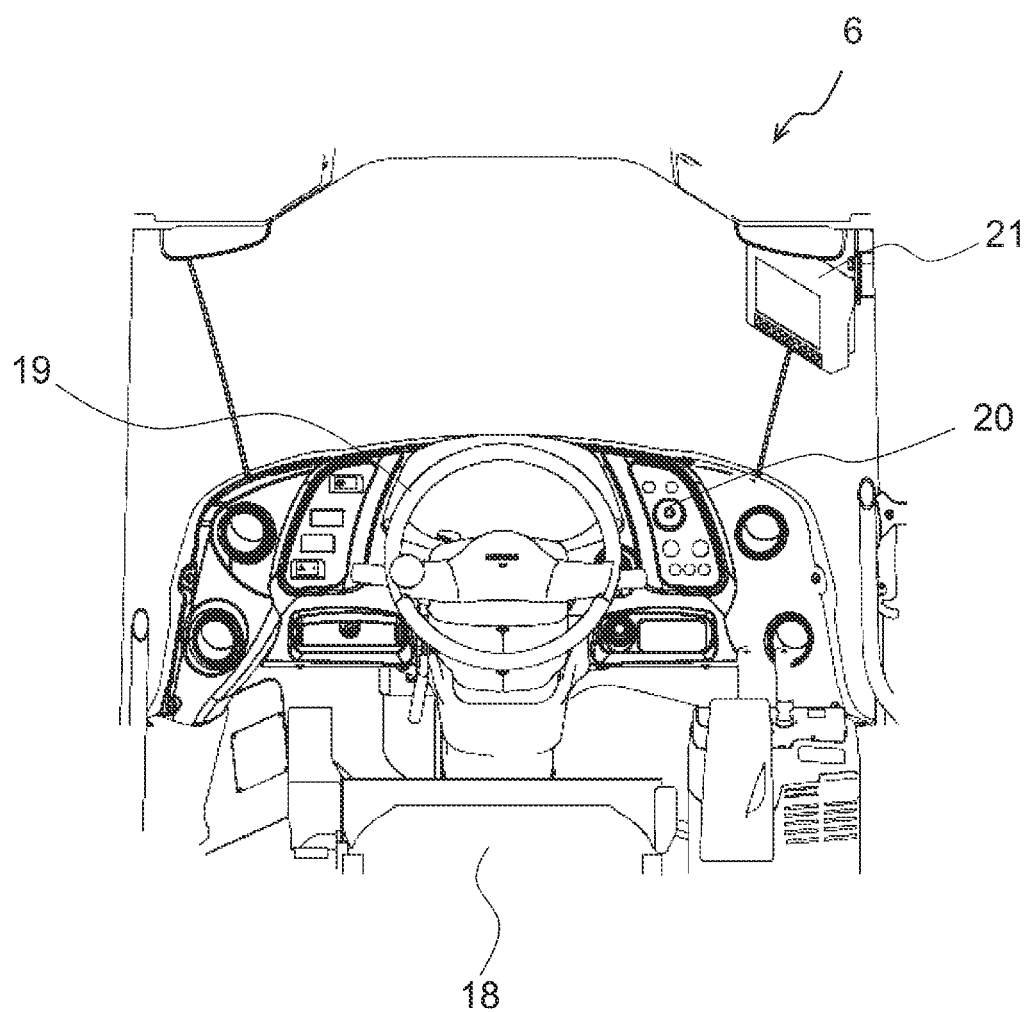
FIG. 2 is a plan view illustrating the internal structure of a cab of the wheel loader depicted in FIG. 1.

FIG. 2 is a plan view illustrating the internal structure of the cab 6. As illustrated in FIG. 2, for example, an operator seat 18, a steering wheel 19, a key switch 20, and a display device (monitor) 21 are installed in the cab 6. The operator seat 18 is a seat on which an operator sits. The steering wheel 19 controls the steering angle of the wheel loader 1. The key switch 20 starts and stops the wheel loader 1. The display device 21 presents information to the operator. The display device 21 displays not only the engine rotational speed and vehicle speed of the wheel loader 1, but also the load W on the bucket 3 that is calculated by a later-described control device 30.

Figure 3:
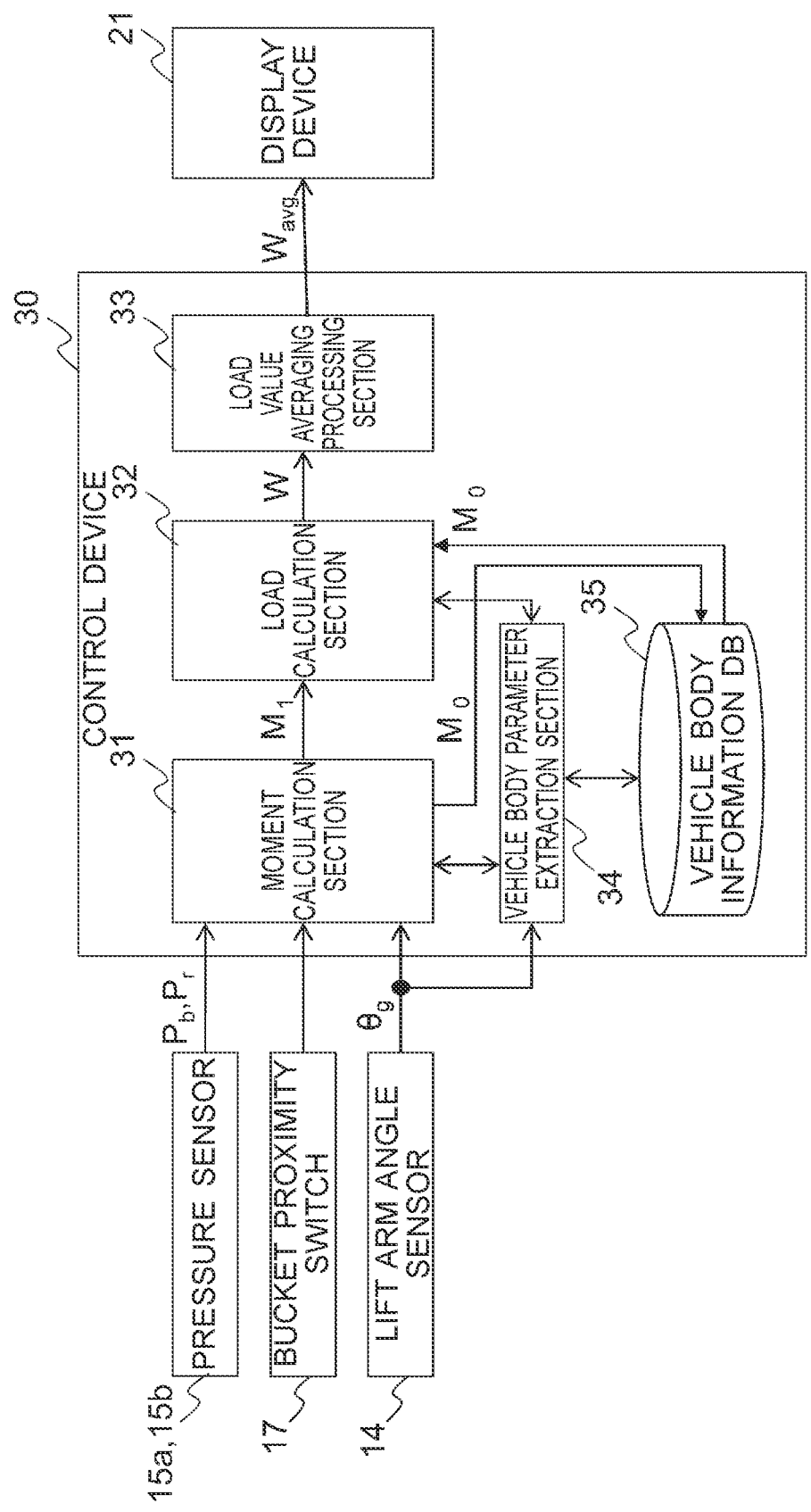
FIG. 3 is a block diagram illustrating a control device according to the first embodiment.

The control device 30, which calculates the load W on the bucket 3, will now be described. The control device 30 includes, for example, a controller installed in the cab 6. The control device 30 performs various processes for calculating the load W on the bucket 3 and displaying a load $W_{avg}$ (average value) on the display device 21. FIG. 3 is a block diagram illustrating the control device 30. As illustrated in FIG. 3, the control device 30 includes a moment calculation section 31, a load calculation section 32, a load value averaging processing section 33, a vehicle body parameter extraction section 34, and a vehicle body information database (DB) 35. The various processes to be performed by the control device 30 are implemented when a CPU (not depicted) loads a program stored, for example, in a hard disk drive (HDD) or other storage device into a memory and executes the loaded program. The vehicle body information database 35 is disposed in the storage device.

Signals and data to be inputted to the moment calculation section 31 are the detection signal of the lift arm angle sensor 14, the detection signals of the pressure sensors 15a, 15b, on/off signals of the bucket proximity switch 17, and dimension data on the working device 27 that is extracted by the vehicle body parameter extraction section 34. When the wheel loader 1 performs a normal operation, the moment calculation section 31 calculates a moment $M_1$ (hereinafter referred to as the loaded moment $M_1$) around the lift arm hinge pin G in a loaded state of the bucket 3 in accordance with a later-described calculation formula. Further, when the wheel loader 1 performs an initial operation, the moment calculation section 31 calculates a moment $M_0$ (hereinafter referred to as the unloaded moment $M_0$) around the lift arm hinge pin G in an unloaded state of the bucket 3, and stores the calculated unloaded moment $M_0$ in the vehicle body information database 35 as an initial learned value.

The load calculation section 32 receives an input of the loaded moment $M_1$ calculated by the moment calculation section 31, an input of the dimension data on the working device 27 that is extracted by the vehicle body parameter extraction section 34, and an input of the initial learned value (unloaded moment $M_0$), and then calculates the load W on the bucket 3 in accordance with a later-described calculation formula.

The load value averaging processing section 33 receives an input of the load W on the bucket 3, which is calculated by the load calculation section 32, and performs a process of averaging the inputted values of the load W on the bucket 3. The load value averaging processing section 33 then outputs data on the averaged load $W_{avg}$ on the bucket 3 to the display device 21.

The vehicle body parameter extraction section 34 receives an input of the detection signal from the lift arm angle sensor 14, extracts, from the vehicle body information database 35, the dimension data on the working device 27 that is based on a lift arm angle 89 (see FIG. 5), and outputs the extracted dimension data to the moment calculation section 31.

The vehicle body information database 35 stores, for example, various dimension data on the working device 27, which are necessary for calculating the load W on the bucket 3, and the value of the unloaded moment $M_0$ (initial learned value).

Figure 4:
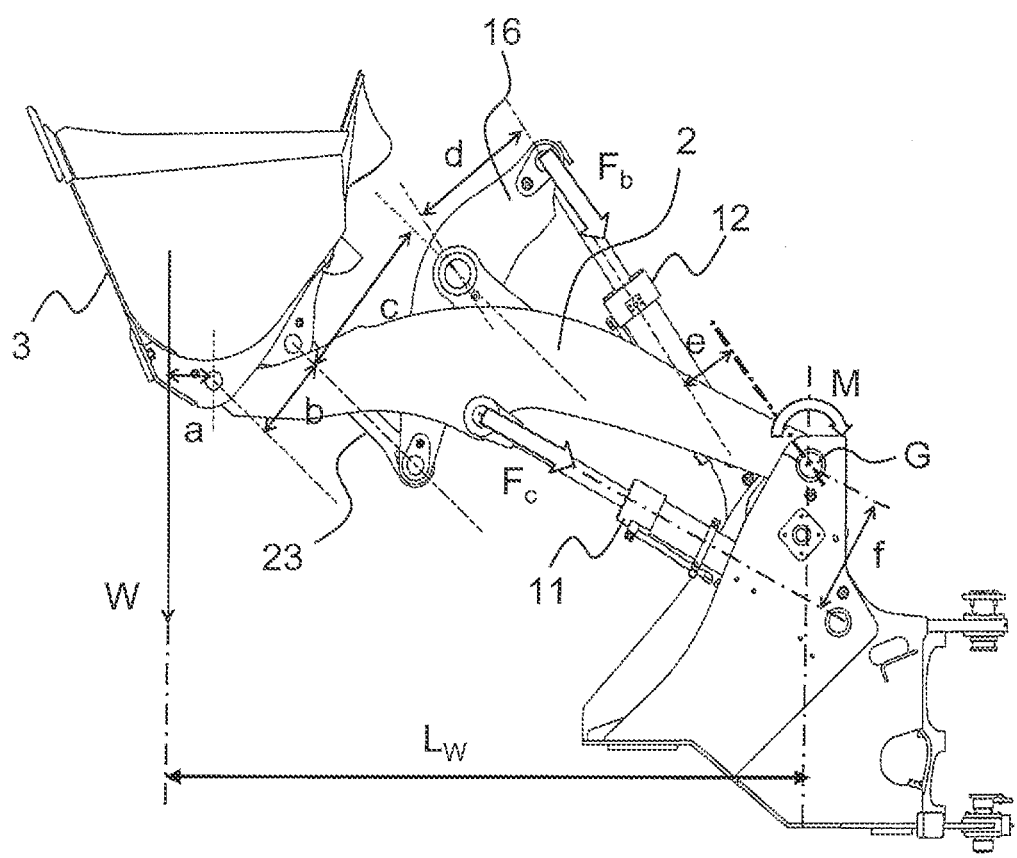
FIG. 4 is a diagram illustrating a calculation model for calculating a load on a bucket.
Figure 5:
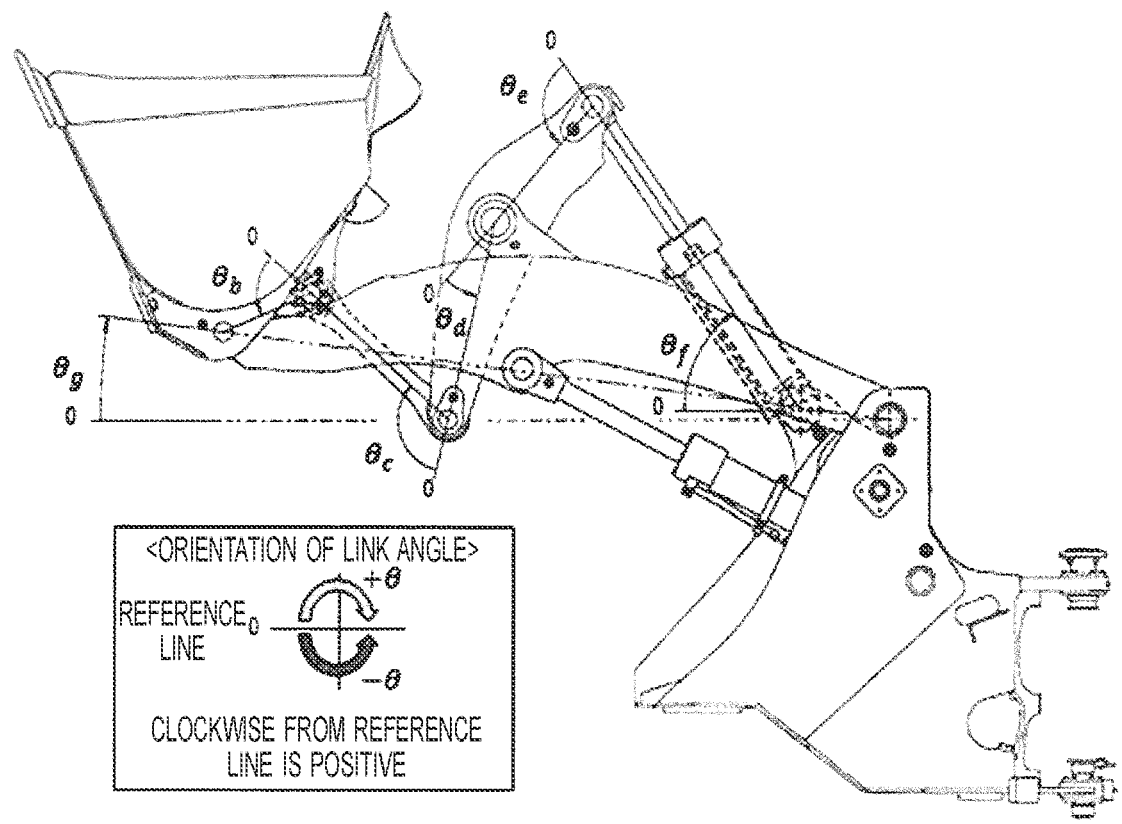
FIG. 5 is a diagram illustrating a calculation model for calculating the load on the bucket.
Figure 6:
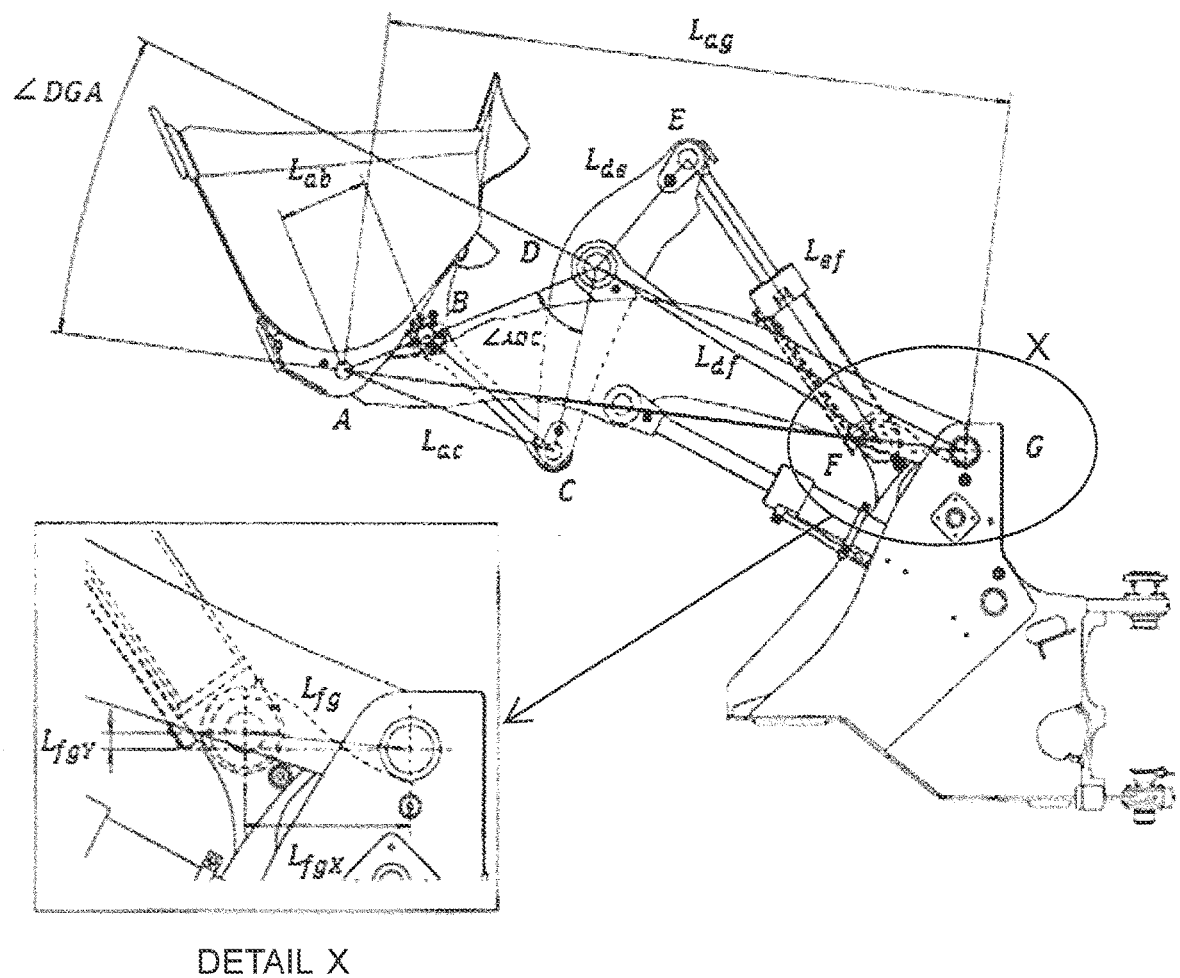
FIG. 6 is a diagram illustrating a calculation model for calculating the load on the bucket.

A method of calculating the load W on the bucket 3 will now be described. FIGS. 4 to 6 are diagrams illustrating calculation models for calculating the load W on the bucket 3.

(Overview and Derivation of Moment-Based Load Calculation Formula)

For the derivation of a calculation formula for calculating the load W on the bucket 3 used in the present embodiment, it is necessary to obtain a relational expression indicative of the relationship between lift arm cylinder pressure and load W that is based on a moment M around the lift arm hinge pin G. For such a purpose, the relationship between force and moment applied to each cylinder 11, 12 is first clarified. The moment M around the lift arm hinge pin G is supported by the bucket cylinder 12 and the lift arm cylinder 11 as depicted in FIG. 4, and the associated relational expression is given by Formula (1) below.

[Formula 1]

$$M = F_c \times f + F_b \times e \quad (1)$$

where:
M=moment around lift arm hinge pin [Nm]
$F_c$=force applied to lift arm cylinder [N]
$F_b$=force applied to bucket cylinder [N]
f=horizontal length between hinge pin and vector of $F_c$ [m]
e=horizontal length between hinge pin and vector of $F_b$ [m]

Next, the relationship among the load W on the bucket 3, the horizontal length $L_w$ between the lift arm hinge pin G and the gravity center position of the load W, the unloaded moment $M_0$, and the loaded moment $M_1$ is expressed by Formula (2) below.

[Formula 2]

$$W = \frac{M_1 - M_0}{L_w} \quad (2)$$

where:
$M_1$=moment around lift arm hinge pin in loaded state [Nm]
$M_0$=moment around lift arm hinge pin in unloaded state [Nm]
W=load [kg]
$L_w$=horizontal length from gravity center position of load The load W can be calculated by calculating the right side of Formula (2). A method of calculating the horizontal length $L_w$ from the gravity center position of the load W will be described later.

(Moment Calculation Formula Based on Cylinder Bottom Pressure)

Next, a formula for calculating the moment M around the lift arm hinge pin G is derived from the bottom pressure and rod pressure of the lift arm cylinder 11, which are actually measured by the pressure sensors 15a, 15b. First of all, a force F applied to the lift arm cylinder 11 can be calculated from the bottom pressure and rod pressure of the lift arm cylinder 11 by using Formula (3) below.

[Formula 3]

$$F = n(A_b \times P_b - A_r \times P_r) \quad (3)$$

where:
n=number of cylinders
$A_b$=bottom side pressure receiving area of cylinder [cm$^2$]
$P_b$=bottom pressure of cylinder [MPa]
$A_r$=rod side pressure receiving area of cylinder [cm$^2$]
$P_r$=rod pressure of cylinder [MPa]

Further, a force $F_b$ applied to the bucket cylinder 12 can be expressed by Formula (4) below in accordance with the formula of equilibrium of moment.

[Formula 4]

$$F_b = W * \left(\frac{a}{b}\right) * \left(\frac{c}{d}\right) \quad (4)$$

where:
a=horizontal length between load center and bucket pin hinge pin [m]
b=distance between bucket pins [m]
c=distance between push rod center length and bell crank center pin [m]
d=distance between bell crank pins [m]

The loaded moment $M_1$ can be calculated from Formulas (1), (3), and (4) by using Formula (5) below. As W=0 when the bucket 3 is in an unloaded state, the influence on the bucket cylinder 12 is not taken into consideration when the unloaded moment $M_0$ is calculated.

[Formula 5]

$$M_1 = 2f(A_b * P_b - A_r * P_r) + W\left(\frac{ace}{bd}\right) \quad (5)$$

(Load Calculation Formula)

When Formula (5) is substituted into Formula (2), the relational expression between the lift arm cylinder pressure and the load W can be derived as expressed in Formula (6) below. The load W on the bucket 3 can be determined by solving Formula (6).

[Formula 6]

$$W = \frac{2f(A_b * P_b - A_r * P_r) - M_0}{L_w - \left(\frac{ace}{bd}\right)} \quad (6)$$

Referring to Formula (6), the bottom pressure of the lift arm cylinder 11, which is detected by the pressure sensor 15a, is substituted into $P_b$, the rod pressure of the lift arm cylinder 11, which is detected by the pressure sensor 15b, is substituted into $P_r$, the values of inter-link distances, which are determined from the dimension data (constant data) pre-stored in the vehicle body information database 35, are substituted into a, b, c, d, e, f, and $L_w$, and the value of unloaded moment stored in the vehicle body information database 35 as an initial learned value at the time of initial operation of the wheel loader 1 is substituted into $M_0$. For reducing the capacity of the storage device, the present embodiment is configured so that the value of the denominator of Formula (6), which is a variable, is stored in the vehicle body information database 35 as table data pre-associated with the value of the lift arm angle sensor 14 (lift arm angle $\theta_g$). Therefore, when sensor data are inputted from the pressure sensors 15a, 15b and the lift arm angle sensor 14, the control device 30 is able to calculate the load W on the bucket 3 in accordance with Formula (6).

Here, the inter-link distances a, b, c, d, e, f, $L_w$ are variables dependent on the lift arm angle $\theta_g$, and can be calculated by using a trigonometric function. A method of calculating the inter-link distances is described below.

First of all, variables and constants used in the following formulas are defined in Table 1. The constants listed in Table 1 are pre-stored in the vehicle body information database 35. Meanwhile, the variables listed in Table 1 vary with the lift arm angle $\theta_g$, and can be determined by the following formulas.

TABLE 1

| Variable | Constant | Unit | Description |
|---|---|---|---|
| $\theta g$ | | deg | Lift arm angle ∠(horizontal, Lag) |
| Ldf | | mm | Length between bell crank D pin and bucket cylinder root F pin |
| | Ldg | mm | Length between bell crank D pin and lift arm hinge G pin |
| | Lfg | mm | Length between bucket cylinder root F pin and lift arm hinge G pin |
| | LfgX | mm | Horizontal length between bucket cylinder root F pin and lift aim hinge G pin |
| | LfgY | mm | Vertical length between bucket cylinder root F pin and lift arm hinge G pin |
| | ∠DGA | deg | ∠(Ldg, Lag) |
| Laf | | Mm | Length between lift arm tip A pin and bucket cylinder root F pin |
| | Lag | mm | Length between lift arm tip A pin and hinge G pin |
| | ∠FGO | deg | ∠(Lfg, Horizontal) |
| $\theta f$ | | deg | Bucket cylinder posture angle ∠(horizontal, Lef) |
| | Lef | mm | Bucket cylinder stroke length |
| $\theta e$ | | deg | Bell crank posture angle ∠(Lde, Lef) |
| | Lde | mm | Bell crank DE pin length |
| ∠ADC | | deg | ∠(Lad, Lcd) |
| | Lad | mm | Length between lift arm tip A pin and center D pin |
| | $\theta d$ | deg | ∠(Lde, Lcd) |
| Lac | | mm | Length between lift arm tip A pin and center C pin |
| | Lcd | mm | Bell crank CD pin length |
| $\theta c$ | | deg | ∠(Lcd, Lbc) |
| | Lbc | mm | Distance between push rod BC pins |
| | Lab | mm | Distance between bucket AB pins |
| $\theta b$ | | deg | ∠(Lbc, Lab) |

(Inter-Link Distance Calculation Formula)

The inter-link distances a, b, c, d, e, f, $L_w$, are derived from formulas (7) to (13) by using a trigonometric function.

[Formula 7]

$$a = L_{loadG} \cos(\theta_f + \theta_e + \theta_d + \theta_c + \theta_b + 180 - H_{loadG}) \quad (7)$$

$$b = -L_{ab} \sin \theta_b \quad (8)$$

$$c = L_{cd} \sin \theta_c \quad (9)$$

$$d = -L_{de} \sin \theta_e \quad (10)$$

$$e = L_{fg} \sin\{(180 - \theta_f) + \angle FGO\} \quad (11)$$

$$f = L_{gi} \sin \theta_i \quad (12)$$

$$L_W = L_{ag} \cos \theta_g + L_{loadG} \cos(\theta_f + \theta_e + \theta_d + \theta_c + \theta_b + 180 - H_{loadG}) \quad (13)$$

where:
$L_{loadG}$ = load center length
$H_{loadG}$ = load center angle
$H_{bmcyl}$ = lift arm cylinder angle
However, $\theta_i$ is determined by formula (14).

[Formula 8]

$$\theta_i = \tan^{-1}\left\{\frac{L_{gi}\sin(\theta_g + H_{bmcyl}) + L_{ghY}}{L_{gi}\cos(\theta_g + H_{bmcyl}) + L_{ghX}}\right\} - (\theta_g + H_{bmcyl}) \quad (14)$$

(Link Posture Angle Calculation Formula)

A method of calculating individual link posture angles (hereinafter referred to as the link angles) $\theta_f$, $\theta_e$, $\theta_c$, $\theta_b$ used in Formulas (7) to (13) above will now be described. Each of the link angles can be geometrically calculated by using the law of cosines in accordance with the dimension data (constant) on the working device 27, which is stored in the vehicle body information database 35, and with the lift arm angle 89 detected by the lift arm angle sensor 14.

The inter-link distances $L_{df}$, $L_{af}$ are determined by the law of cosines as expressed in Formulas (15) and (16), respectively.

[Formula 9]

$$L_{df} = \sqrt{\frac{L_{dg}^2 + L_{fg}^2 - 2L_{dg}}{\{L_{fgX}\cos(\theta_g + \angle DGA) + L_{fgY}\sin(\theta_g + \angle DGA)\}}} \quad (15)$$

$$L_{af} = \sqrt{L_{ag}^2 + L_{fg}^2 - 2L_{ag}L_{fg}\cos(\theta_g - \angle FGO)} \quad (16)$$

In this instance, the link angles $\theta_f$, $\theta_e$ are derived as expressed in Formulas (17) and (18), respectively.

[Formula 10]

$$\theta_f = \tan^{-1}\left\{\frac{L_{dg}\sin(\theta_g + \angle DGA) - L_{fgY}}{L_{dg}\cos(\theta_g + \angle DGA) - L_{fgX}}\right\} + \cos^{-1}\left(\frac{L_{df}^2 + L_{ef}^2 - L_{de}^2}{2L_{df}L_{ef}}\right) \quad (17)$$

$$\theta_e = \cos^{-1}\left(\frac{L_{de}^2 + L_{ef}^2 - L_{df}^2}{2L_{de}L_{ef}}\right) - 180 \quad (18)$$

Further, based on the inter-link distances $L_{df}$, $L_{af}$ calculated from Formulas (15) and (16), the angle ADC and the distance Lac are determined by the law of cosines as expressed in Formulas (19) and (20), respectively.

[Formula 11]

$$\angle ADC = \cos^{-1}\left(\frac{L_{ad}^2 + L_{df}^2 - L_{af}^2}{2L_{ad}L_{df}}\right) + \cos^{-1}\left(\frac{L_{de}^2 + L_{df}^2 - L_{ef}^2}{2L_{de}L_{df}}\right) - 180 - \theta_d \quad (19)$$

$$L_{ac} = \sqrt{L_{ad}^2 + L_{cd}^2 - 2L_{ad}L_{cd}\cos\angle ADC} \quad (20)$$

In this instance, the link angles $\theta_c$, $\theta_b$ are derived as expressed in Formulas (21) and (22), respectively.

[Formula 12]

$$\theta_c = 180 + \cos^{-1}\left(\frac{L_{ac}^2 + L_{bc}^2 - L_{ab}^2}{2L_{ac}L_{bc}}\right) - \cos^{-1}\left(\frac{L_{cd} - L_{ad}\cos\angle ADC}{L_{ac}}\right) \quad (21)$$

$$\theta_b = \cos^{-1}\left(\frac{L_{ab}^2 + L_{bc}^2 - L_{ac}^2}{2L_{ab}L_{bc}}\right) - 180 \quad (22)$$

When the variables determined by Formulas (15 to 22) are substituted into Formulas (7) to (13), the inter-link distances a, b, c, d, e, f, $L_w$ are obtained.

Figure 7:
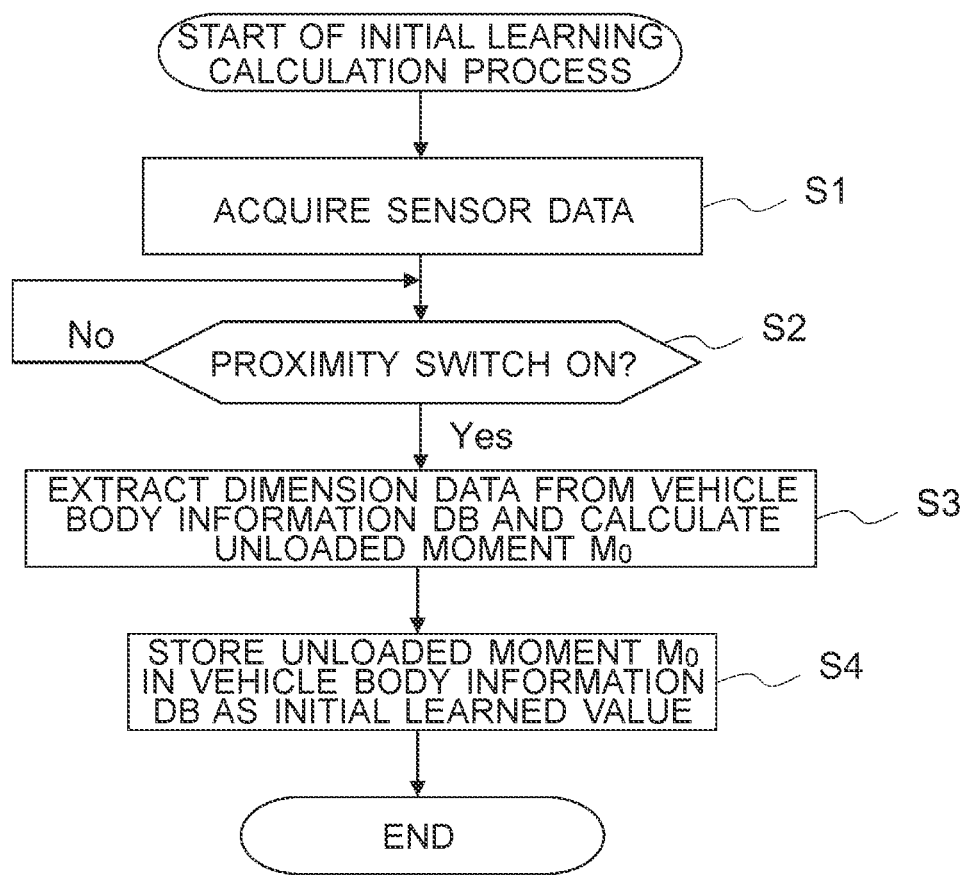
FIG. 7 is a flowchart illustrating the steps of an initial learning calculation process.

Steps of calculation processes performed by the control device 30 will now be described. First of all, an initial learning calculation process to be performed at the time of initial operation of the wheel loader 1 will be described. FIG. 7 is a flowchart illustrating the steps of the initial learning calculation process. The process depicted in FIG. 7 is performed only in a case where, for example, the control device 30 is placed in an initial learning setting mode when the wheel loader 1 is to be shipped. The process starts when the key switch 20, which starts and stops the wheel loader 1, is turned on. Switching into the initial learning setting mode can be made when, for example, the operator outputs a mode change command from a dedicated terminal device to the control device 30.

As illustrated in FIG. 7, the moment calculation section 31 acquires sensor data from the pressure sensors 15a, 15b and the lift arm angle sensor 14 (step S1). Upon receipt of an ON signal inputted from the bucket proximity switch 17 ("YES" at step S2), the moment calculation section 31 determines that the bucket 3 is in a posture ready to be loaded with earth, sand, and other materials, and requests the vehicle body parameter extraction section 34 to extract dimension data on the working device 27. Based on the lift arm angle $\theta_g$ received from the lift arm angle sensor 14, the vehicle body parameter extraction section 34 extracts the dimension data corresponding to the lift arm angle $\theta_g$ from the vehicle body information database 35, and outputs the extracted dimension data to the moment calculation section 31. Based on the inputted sensor data and dimension data, the moment calculation section 31 calculates the unloaded moment $M_0$ (step S3). The moment calculation section 31 then stores the unloaded moment $M_0$ in the vehicle body information database 35 as the initial learned value (step S4). If the ON signal is not inputted from the bucket proximity switch 17 ("NO" at step S2), the moment calculation section 31 stands by in step S2 until the ON signal is inputted.

Figure 8:
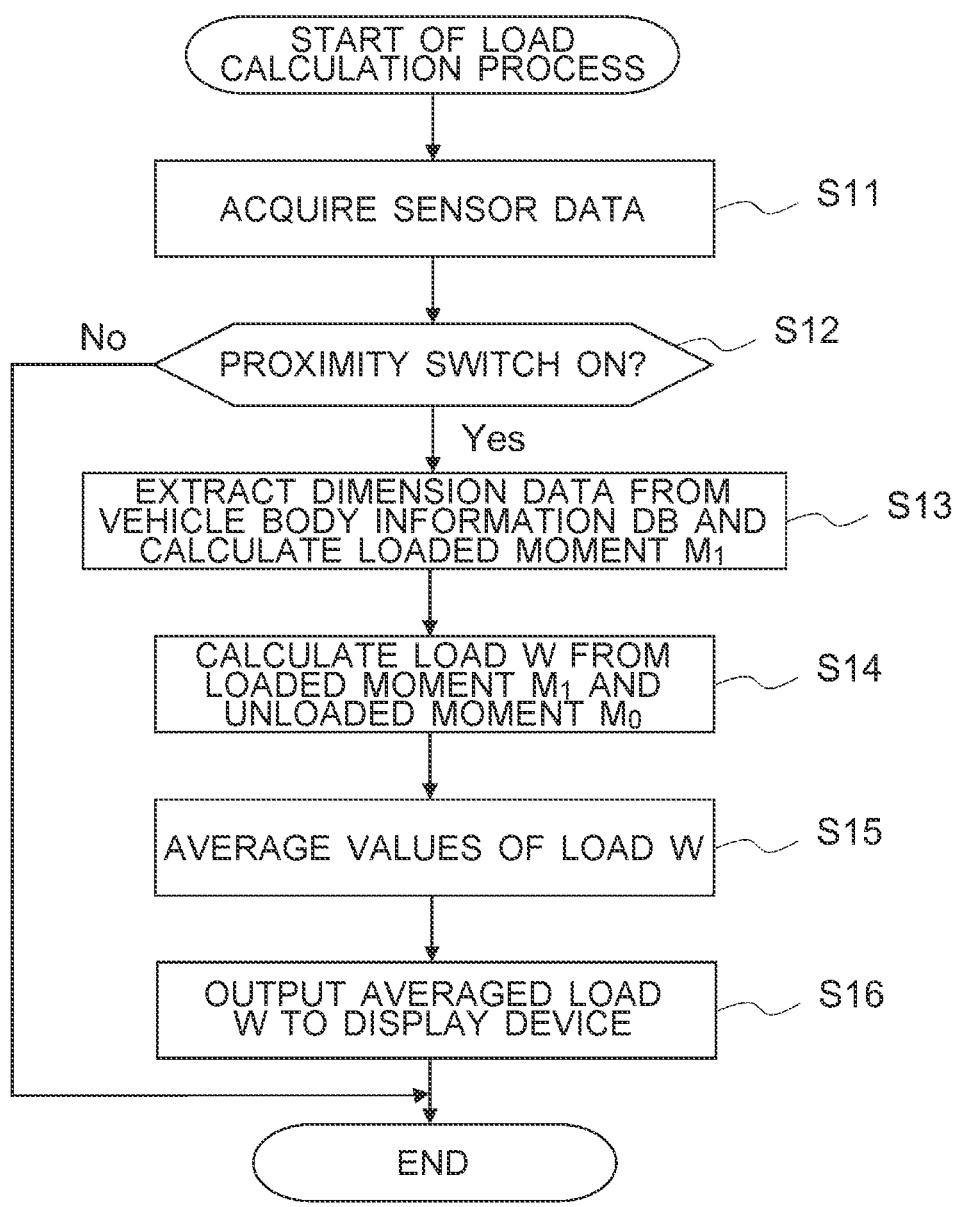
FIG. 8 is a flowchart illustrating the steps of a load calculation process.

A load calculation process of calculating the load W on the bucket 3 will now be described. FIG. 8 is a flowchart illustrating the steps of the load calculation process. The process depicted in FIG. 8 starts when the key switch 20, which starts and stops the wheel loader 1, is turned on at the time of normal operation. The process is repeatedly executed at predetermined intervals (e.g., at intervals of several seconds) by performing steps S1 to S4.

As illustrated in FIG. 8, the moment calculation section 31 acquires sensor data from the pressure sensors 15a, 15b and the lift arm angle sensor 14 (step S11). Upon receipt of an ON signal inputted from the bucket proximity switch 17 ("YES" at step S12), the moment calculation section 31 determines that the bucket 3 is in a posture ready to be loaded with earth, sand, and other materials, and requests the vehicle body parameter extraction section 34 to extract dimension data on the working device 27. Based on the lift arm angle $\theta_g$ received from the lift arm angle sensor 14, the vehicle body parameter extraction section 34 extracts the dimension data corresponding to the lift arm angle $\theta_g$ from the vehicle body information database 35, and outputs the extracted dimension data to the moment calculation section 31. Based on the inputted sensor data and dimension data, the moment calculation section 31 calculates the loaded moment $M_1$, and outputs the calculated loaded moment $M_1$ to the load calculation section 32 (step S13).

The load calculation section 32 acquires the dimension data stored in the vehicle body information database 35 via the vehicle body parameter extraction section 34, and additionally acquires the unloaded moment M from the vehicle body information database 35. Then, by using Formula (6) above, the load calculation section 32 calculates the load W on the bucket 3 from the difference between the loaded moment $M_1$ and the unloaded moment $M_0$, and outputs the calculated load W to the load value averaging processing section 33 (step S14).

The load value averaging processing section 33 averages the values of the load W periodically inputted from the load calculation section 32 (step S15), and outputs the averaged load $W_{avg}$ to the display device 21 (step S16). Accordingly, the display device 21 displays the load on the bucket 3 during a loading operation of the wheel loader 1. If the ON signal is not inputted from the bucket proximity switch 17 ("NO" at step S12), the process terminates.

As described above, the first embodiment uses the above-described calculation formulas for the wheel loader 1, which supports the load on the bucket 3 with the lift arm cylinder 11 and the bucket cylinder 12. Therefore, the first embodiment makes it possible to accurately calculate the load W on the bucket 3 from the dimension data on the working device 27, the bottom pressure and rod pressure of the lift arm cylinder 11, and the angle of the lift arm 2 without having to detect the pressure of the bucket cylinder 12.

Further, conventional wheel loaders, in most cases, do not include a sensor for detecting the pressure of the bucket cylinder 12. Meanwhile, the present embodiment eliminates the necessity of detecting the pressure of the bucket cylinder 12. Therefore, the load W on the bucket 3 can easily be calculated simply by incorporating a load calculation program according to the present invention into a controller for a conventional wheel loader.

Furthermore, when the unloaded moment $M_0$ is determined once at the time of initial operation of the wheel loader 1, the present embodiment makes it possible to calculate the load W on the bucket 3 and display the calculated load W on the display device 21. In the past, it was necessary to load a bucket with a calibration weight or other load whose weight is accurately known, and perform initial learning of the relationship among lift arm cylinder pressure, lift arm angle, and load weight. Further, it was necessary to perform such initial learning a number of times while varying the weight of the load. Thus, the initial learning was extremely troublesome. Additionally, in a case where a bucket was field-replaced, it was necessary to perform the similar initial learning. In most cases, however, a calibration weight or other heavy load could not be prepared in the field. This made it difficult to perform the initial learning.

Meanwhile, the wheel loader 1 according to the first embodiment is configured so that the control device 30 automatically calculates the unloaded moment $M_0$ when the lift arm 2 is raised to keep the bucket 3 in a crowding posture. This eliminates the necessity of performing initial learning by using a calibration weight or other similar load. Consequently, even in a case where the bucket 3 is field-replaced, the load W on the newly employed bucket 3 can be accurately calculated as far as the unloaded moment $M_0$ is calculated once, at the time of an initial operation subsequent to bucket replacement, from the bottom pressure and rod pressure of the lift arm cylinder 11, which are detected by the pressure sensors 15a, 15b, and the lift arm angle 89 detected by the lift arm angle sensor 14.

Second Embodiment

The wheel loader according to a second embodiment of the present invention will now be described. The second embodiment differs from the first embodiment in the configuration of the control device. Therefore, the following description mainly deals with the difference in the control device, and elements identical with those in the first embodiment will not be redundantly described.

Figure 9:
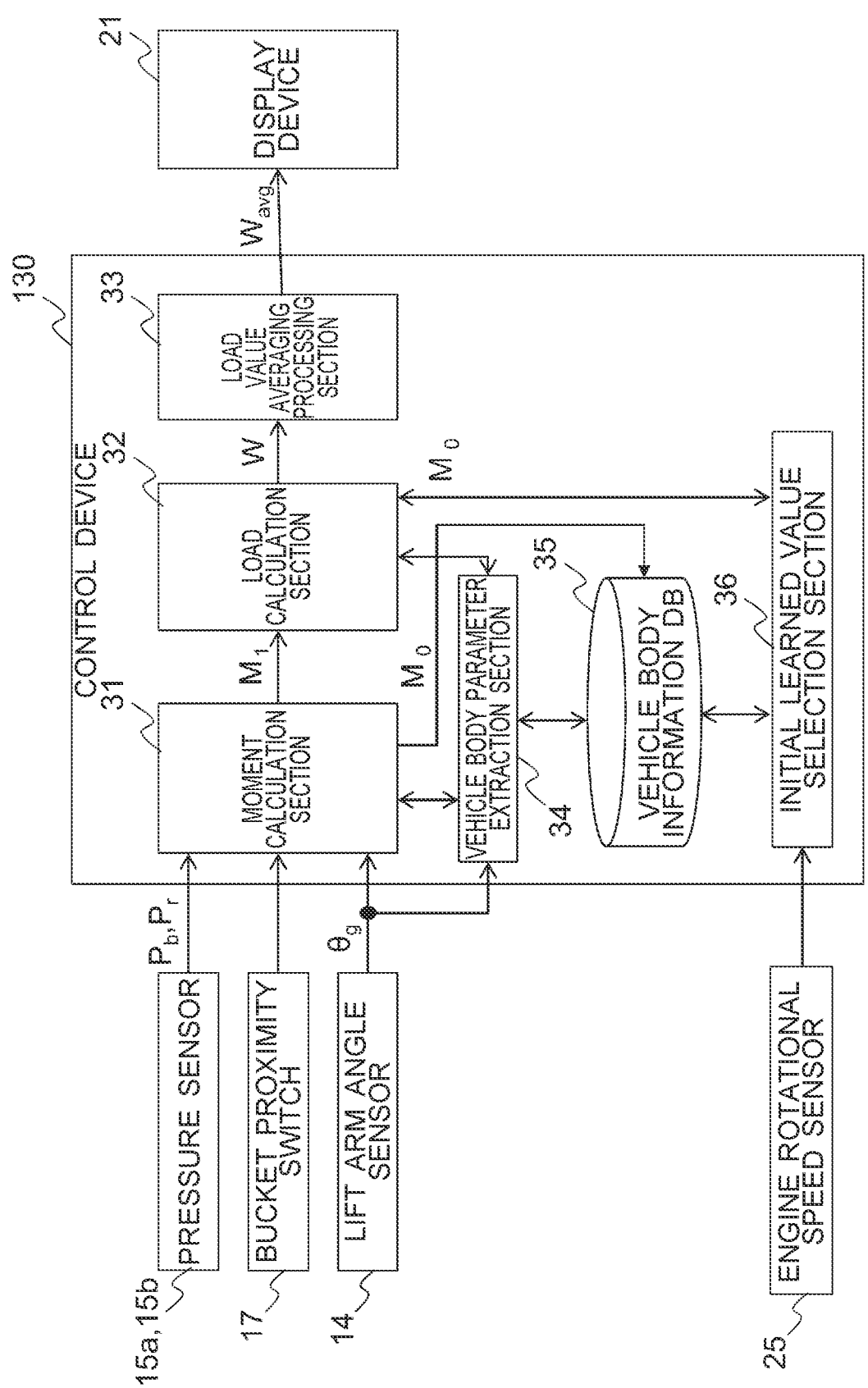
FIG. 9 is a block diagram illustrating the control device according to a second embodiment of the present invention.

FIG. 9 is a block diagram illustrating the control device 130 according to the second embodiment. As illustrated in FIG. 9, the wheel loader according to the second embodiment includes an engine rotational speed sensor 25 in order to detect the rotational speed of the engine. Thus, the second embodiment differs from the first embodiment in that the vehicle body information database 35 stores a plurality of values of the unloaded moment $M_0$ corresponding to various engine rotational speeds. Therefore, as the initial learning, the moment calculation section 31 calculates the plurality of values of the unloaded moment $M_0$ for various engine rotational speeds, and stores the calculated values of the unloaded moment $M_0$ in the vehicle body information database 35. When calculating the load W on the bucket 3, the load calculation section 32 requests an initial learned value selection section 36 to extract the unloaded moment $M_0$ corresponding to an engine rotational speed inputted from the engine rotational speed sensor 24. The load calculation section 32 then calculates the load W by using the unloaded moment $M_0$ corresponding to the engine rotational speed outputted from the initial learned value selection section 36.

The second embodiment permits the use of the unloaded moment $M_0$ corresponding to the engine rotational speed and thus makes it possible to calculate the load W on the bucket 3 more accurately than the first embodiment. More specifically, the bottom pressure and rod pressure of the lift arm cylinder 11, which are detected by the pressure sensors 15a, 15b, also vary with the engine rotational speed. Consequently, when a plurality of values of the unloaded moment $M_0$ corresponding to various values of the engine rotational speed are stored in the vehicle body information database 35, the load W on the bucket 3 can be calculated more accurately in consideration of the engine rotational speed.

The foregoing embodiments are merely illustrative for explaining the present invention and are not intended to limit the scope of the present invention to the foregoing embodiments alone. Persons skilled in the art can implement the present invention in various other modes without departing from the spirit of the present invention.

LIST OF REFERENCE SIGNS

1: Wheel loader
2: Lift arm
3: Bucket
5: Front frame (vehicle body)
9: Rear frame (vehicle body)
11: Lift arm cylinder
12: Bucket cylinder
14: Lift arm angle sensor
15a, 15b: Pressure sensor
16: Bell crank
17: Bucket proximity switch
21: Display device
23: Push rod
25: Engine rotational speed sensor
30: Control device
31: Moment calculation section
32: Load calculation section
33: Load value averaging processing section
34: Vehicle body parameter extraction section
35: Vehicle body information database (DB)
36: Initial learned value selection section
130: Control device

The invention claimed is:

1. A wheel loader comprising:
a vehicle body;
a working device that includes a lift arm, a lift arm cylinder, a bucket, and a bucket cylinder, the lift arm being disposed at the front of the vehicle body and coupled to the vehicle body via a hinge pin, the lift arm cylinder rotating the lift arm in a vertical direction, the bucket being coupled to a tip of the lift arm, the bucket cylinder rotating the bucket in the vertical direction;
a lift arm angle sensor that detects the angle of the lift arm;
a pressure sensor that detects the pressure of the lift arm cylinder;
a control device that calculates a load on the bucket; and
a vehicle body information database that stores vehicle body information including dimension data on the working device;
a display device that presents information to an operator, wherein, in an unloaded state of the bucket, the control device calculates an unloaded moment, namely, the moment around the hinge pin, from the pressure of the lift arm cylinder that is detected by the pressure sensor, the angle of the lift arm that is detected by the lift arm angle sensor, and the dimension data extracted from the vehicle body information database, in a loaded state of the bucket, the control device calculates a loaded moment, namely, the moment around the hinge pin, from the pressure of the lift arm cylinder that is detected by the pressure sensor, the angle of the lift arm that is detected by the lift arm angle sensor, and the dimension data extracted from the vehicle body information database, the control device calculates the load on the bucket by dividing the difference between the unloaded moment and the loaded moment by the horizontal distance between the hinge pin and the gravity center position of the bucket, and the control device performs to display the calculated load on the bucket on the display device.

2. The wheel loader according to claim 1,
wherein, at the time of initial operation of the wheel loader, the control device calculates the unloaded moment and stores the calculated unloaded moment in the vehicle body information database, and
when calculating the load on the bucket at the time of normal operation of the wheel loader, the control device calculates the load on the bucket from the unloaded moment and the loaded moment, the unloaded moment being stored in the vehicle body information database, the loaded moment being calculated based on measured data from the pressure sensor and the lift arm angle sensor.

3. The wheel loader according to claim 2, further comprising:
an engine that drives the vehicle body to travel; and
an engine rotational speed sensor that detects the rotational speed of the engine,
wherein, at the time of initial operation of the wheel loader, the control device calculates a plurality of values of the unloaded moment corresponding to a plurality of values of the engine rotational speed and stores the calculated values in the vehicle body information database in association with the values of the engine rotational speed, and
when calculating the load on the bucket at the time of normal operation of the wheel loader, the control device calculates the load on the bucket from the unloaded moment and the loaded moment, the unloaded moment being corresponding to the engine rotational speed detected by the engine rotational speed sensor, the loaded moment being calculated based on a measured value.

4. The wheel loader according to claim 2, further comprising:
a bucket proximity switch that turns on when a rod of the bucket cylinder is in the most contracted state,
wherein the control device calculates the unloaded moment and the loaded moment in response to an ON signal from the bucket proximity switch.

5. The wheel loader according to claim 1, further comprising:
a bucket proximity switch that turns on when a rod of the bucket cylinder is in the most contracted state,
wherein the control device calculates the unloaded moment and the loaded moment in response to an ON signal from the bucket proximity switch.

6. A bucket load calculation method that is applied to a wheel loader and used to calculate a load on a bucket, the wheel loader including a vehicle body, a working device, a lift arm angle sensor, a pressure sensor, a vehicle body information database, and a display device that presents information to an operator, the working device including a lift arm, a lift arm cylinder, a bucket, and a bucket cylinder, the lift arm being disposed at the front of the vehicle body and coupled to the vehicle body via a hinge pin, the lift arm cylinder rotating the lift arm in a vertical direction, the bucket being coupled to a tip of the lift arm, the bucket cylinder rotating the bucket in the vertical direction, the lift arm angle sensor detecting the angle of the lift arm, the pressure sensor detecting the pressure of the lift arm cylinder, the vehicle body information database storing various vehicle body information including dimension data on the working device, the bucket load calculation method comprising:

a first step of calculating, in an unloaded state of the bucket, an unloaded moment, namely, the moment around the hinge pin, from the pressure of the lift arm cylinder that is detected by the pressure sensor, the angle of the lift arm that is detected by the lift arm angle sensor, and the dimension data extracted from the vehicle body information database, and storing the calculated unloaded moment in the vehicle body information database as an initial learned value;

a second step of calculating, in a loaded state of the bucket, a loaded moment, namely, the moment around the hinge pin, from the pressure of the lift arm cylinder that is detected by the pressure sensor, the angle of the lift arm that is detected by the lift arm angle sensor, and the dimension data extracted from the vehicle body information database;

a third step of calculating the load on the bucket by dividing the difference between the unloaded moment and the loaded moment by the horizontal distance between the hinge pin and the gravity center position of the bucket, the unloaded moment being stored in the vehicle body information database in the first step, the loaded moment being calculated in the second step; and a fourth step of displaying the load on the bucket calculated in the third step on the display device.

* * * * *